United States Patent [19]
Smith et al.

[11] 3,943,082
[45] Mar. 9, 1976

[54] THERMOSETTING POWDER COATINGS

[75] Inventors: Oliver Wendell Smith, South Charleston; Joseph Victor Koleske, Charleston, both of W. Va.

[73] Assignee: Union Carbide Corporation, New York, N.Y.

[22] Filed: Dec. 4, 1974

[21] Appl. No.: 529,524

[52] U.S. Cl. ..... 260/23 AR; 260/23 R; 260/23 XA; 260/30.4 EP; 260/836; 260/837 PV; 427/27; 427/195; 427/410; 428/418; 428/469; 428/522
[51] Int. Cl.² C08K 5/15; C08L 63/02; C08L 91/00
[58] Field of Search ........ 260/23 R, 23 AR, 23 XA, 260/876 R, 899, 30.4 EP, 836, 837; 427/212, 407, 410

[56] References Cited
UNITED STATES PATENTS

| | | | |
|---|---|---|---|
| 3,251,904 | 5/1966 | Souder et al. | 260/876 R |
| 3,377,323 | 4/1968 | Ioka et al. | 357/84 |
| 3,561,003 | 2/1971 | Lanham et al. | 106/22 |
| 3,678,133 | 7/1972 | Ryan | 260/876 R |
| 3,739,049 | 6/1973 | Honjo | 264/14 |
| 3,859,389 | 1/1915 | Carty | 260/23 AR |
| 3,867,481 | 2/1975 | Whang | 260/876 |

*Primary Examiner*—Donald E. Czaja
*Assistant Examiner*—H. H. Fletcher
*Attorney, Agent, or Firm*—Francis M. Fazio

[57] ABSTRACT

Powder coating compositions of copolymers of vinyl chloride and a glycidyl acrylyl compound containing a crosslinker for the oxirane groups of the acrylyl compound and the epoxy resin and a minor amount of a plasticizing epoxy resin have been produced having improved flow properties.

10 Claims, No Drawings

THERMOSETTING POWDER COATINGS

BACKGROUND OF THE INVENTION

The coatings industry is undergoing massive changes in its philosophy, a great deal thereof being the result of the ecological problems associated with the use of the conventional solvent-based coating compositions. In the past the most commonly used coatings were compositions of pigmented or unpigmented liquid vehicles that were diluted with solvents to facilitate application. After application on the surface, the solvents were permitted to evaporate, often into the atmosphere, leaving a dry, uniform coating on the surface. With time, advances led to the development of organosols, plastisols, emulsions, dispersions, 100 per cent reactive solids coatings, water-borne coatings, all of which are used today to some extent. In addition, within the past two decades much effort has been expended in the preparation and application of powder coatings, the initial impetus therefore being the discovery of the fluidized-bed technology in Germany. This initial effort in the powder coating field involves the submersion of a preheated article into a bed of powder particles, the particles generally being from 50 to 150 microns in size, fluidized by a stream of gas. On immersion in the fluidized-bed, powder particles adhere and coalesce on to the surface of the article forming a uniform coating, usually in excess of 5 mils thick and often as much as 100 mils thick. The relatively large particle sizes required for fluidized-bed coating technology precludes the formation of the thin coatings of from 0.2 to 2 or 3 mils thick that are often desired. Many further attempts have been made to apply such thin coatings, the most recent efforts being directed to the electrostatic spray coating of particles to the grounded article to be coated followed by heating to fuse the particles and form a uniform coating. This method has recently been finding wide acceptance because of the many advantages associated therewith, e.g., improved film properties, absence of volatile solvents, elimination of water pollution problems, essentially 100 per cent utilization of material, reduced capital expenditures, ease of change-over.

Among the many powder coatings that have found widespread use are included the epoxy polymers. However, these epoxy materials are known to be deficient in outdoor weathering and in acidic environments. Consequently, it is of interest to obtain new epoxy-type powder coating compositions that do not have these deficiencies.

SUMMARY OF THE INVENTION

A uniform mixture of one or more polymers of vinyl chloride, vinyl acetate and a glycidyl acrylyl compound blended with an epoxy resin plasticizer or curing agent, such as bisphenol type epoxy resins, aliphatic diglycidyl ethers, diglycidyl esters, epoxidized oils, and aliphatic and cycloaliphatic epoxide monomers and resins thereof and a crosslinker, if desired, such as a polycarboxylic acid or a polyol, is converted to a powder coating composition which can be used to apply a powder coating on a substrate and cured to a uniform thermoset film. The compositions preferably contain a stannous salt as a catalyst, such as stannous carboxylate, to obtain a faster cure and improved finished coating properties.

DESCRIPTION OF THE INVENTION

The powder coating compositions of this invention are those containing the vinyl chloride polymer and an epoxy resin plasticizer or curing agent, as will hereinafter be more fully described. The presence of the epoxy resin plasticizer results in an improvement in surface appearance as it improves the flow properties of the powder coating during the baking procedure. It has also been found that thinner coatings are obtainable with the vinyl resin powder coatings containing the epoxy resin plasticizer as compared to the same vinyl resin powder that does not contain the epoxy resin plasticizer when powder coating compositions of equal particle size are compared.

The vinyl polymers suitable for use in producing the powder coating compositions are those containing the glycidyl group. This group is essential in the polymer molecule. The preferred vinyl polymers are those containing from about 50 to 95 weight per cent of vinyl chloride, from 0 to 40 weight per cent of vinyl acetate and from 1 to 25 weight per cent of the glycidyl acrylyl compound. If desired, the polymer can contain from 0 to 40 weight per cent of one or more other ethylenically unsaturated polymerizable monomers having the >CH=CH< group polymerized therein. These other monomers can be any of the known ethylenically unsaturated monomers and include for example, the styrenes, the alkyl and hydroxyalkyl acrylates and methacrylates, the vinyl esters, the vinyl ketones, the olefins, the vinyl alkyl ethers, vinylidene chloride, butadiene, the acrylamides, acrylonitrile, acrylic acid, the dialkyl maleates and fumarates and the like. The specific individual monomers within these generic groups are well known in the art and do not need extensive enumeration in order to enable one skilled in this art to know what they are. The term glycidyl acrylyl compound means glycidyl acrylate and glycidyl methacrylate.

The preferred vinyl polymers defined above are those which have a glass transition temperature of about 40°C. or higher. The powder coating compositions also have such glass transition temperature and have been observed to possess good room temperature stability and do not agglomerate, bridge or block on storage. The preferred vinyl polymers are those that have a number average molecular weight of from about 5,000 to about 25,000, though polymers having molecular weights of from 2,500 to 40,000 can also be used.

Among suitable polymers, within the above description, one can mention vinyl chloride/vinyl acetate/glycidyl acrylyl (in this listing "acrylyl" can be either acrylate or methacrylate), vinyl chloride/vinyl acetate/vinylidene chloride/glycidyl acrylyl, vinyl chloride/glycidyl acrylyl, vinyl chloride/ethyl acrylate/glycidyl acrylyl, vinyl chloride/vinyl acetate/vinyl ethyl ether/glycidyl acrylyl, vinyl chloride/styrene/glycidyl acrylyl, vinyl chloride/vinyl acetate/styrene/glycidyl acrylyl, vinyl chloride/vinyl acetate/butadiene/glycidyl acrylyl, vinyl chloride/acrylonitrile/glycidyl acrylyl, vinyl chloride/vinyl acetate/acrylonitrile/glycidyl acrylyl, vinyl chloride/vinyl acetate/diethyl maleate/glycidyl acrylyl, vinyl chloride/vinyl acetate/2-hydroxyethyl acrylate/glycidyl acrylyl, vinyl chloride/vinyl acetate/vinyl ethyl ketone/glycidyl acrylyl, vinyl chloride/vinyl acetate/acrylamide/glycidyl acrylyl, and the like. The listing is illustrative and not all-encompassing.

The epoxy resin plasticizer is present at a minor concentration of from about 1 to 15 weight per cent, preferably from 2 to 5 weight per cent, based on the weight of vinyl polymer present. The epoxy resin plasticizers which may be used in combination with the vinyl polymer can include bisphenol type epoxy resins, cycloaliphatic epoxy monomers and resins, aliphatic diglycidyl ethers, diglycidyl esters and epoxidized oils. The most desirable epoxy resins are the polyoxiranes, such as the diglycidyl ether of bisphenol-A and homologues thereof and epoxidized soybean or linseed oils. Other epoxide oligomers prepared by reacting phenols, polyols, or carboxylic acids with an excess of the above epoxides can also be used.

The epoxy resin plasticizers are known compounds and those skilled in the art do not require extensive description and enumeration in view of their common knowledge. Illustrative of suitable epoxy resin plasticizers or curing agents one can mention 3,4-epoxycyclohexylmethyl-3,4-epoxycyclohexane carboxylate, the diglycidyl ethers of bisphenol-A, epoxidized soyabean oil, epoxidized linseed oil, 1,3-bis(2,3-epoxypropoxy)-benzene, 2,2-bis[p-(2,3-epoxypropoxy)phenol]-propane, 2,2-bis[4-(2,3-epoxypropoxy)-3,5-dibromophenyl] propane, polyphenolformaldehyde poly(2,3-epoxypropyl) ether, poly-o-cresolformaldehyde poly(2,3-epoxypropyl) ether, 2,2-bis[4-(2,3-epoxypropoxy) cyclohexyl] propane, 1,2-epoxy -6-(2,3-epoxypropoxy)-hexahydro- 4,7-methanoidane, bis(3,4-epoxy-6-methylcyclo-hexylmethyl) adipate, and the like.

One also includes in the powder coating composition a crosslinker for the oxirane group of the glycidyl acrylyl compound and the epoxy resin plasticizer component. This can be a carboxylic acid, a polycarboxylic acid, a polyol, a hydroxycarboxylic acid, acid-containing polymers, acid-capped polyesters, an amine, a hydroxylamine or phenols. The compounds useful as epoxy crosslinkers are well-known to those skilled in the art and any of them can be used, including, for example, benzoic acid, lauric acid, adipic acid, succinic acid, malic acid, itaconic acid, sebacic acid, brassylic acid, pentaerythritol, trimethylolpropane, trimethylolethane, ethylene glycol, polyethylene glycol, trimethylol propane/isophthalic acid/neopentyl glycol/adipic acid polyester, hydroxyaniline, hexamethylene diamine, omega-hydroxydecanoic acid, bisphenol-A, and the like. It is known that the crosslinkers react with the oxirane moiety to open the ring and form crosslinking bridges between the chains.

The crosslinker is generally present in the powder coating compositions at a concentration of from 0.1 to 1 mole equivalent of reactive group per mole equivalent of oxirane group in the polymer molecule, preferably from 0.2 to 0.6 mole equivalent.

While the presence of a catalyst is not an absolute necessity where one is not concerned with the production of an optimum thermoset film coating at a rapid rate, the use of a catalyst has been found to yield thermoset films of improved properties at a much faster rate. The preferred catalysts are the stannous acylate compounds in which the acylate group contains from 2 to 25 carbon atoms, preferably from 8 to 20 carbon atoms. Illustrative thereof one can mention stannous acetate, stannous butyrate, stannous pivalate, stannous octoate, stannous decanoate, stannous caproate, stannous laurate, stannous palmitate, stannous stearate, stannous archidate, stannous lignocerate and the like. Also suitable are any of the other known catalysts, e.g., uranyl salts, boron trifluoride etherates, tetralkylammonium halides, and the like. Any catalytic amount of catalyst sufficient to influence the reaction of the oxirane group can be used. These amounts are known to those skilled in the art. In the absence of catalyst, the acid strength or $pK_a$ value of the carboxylic acid crosslinker can be used to control the rate of crosslinking. High acid strength crosslinkers result in rapid reaction rates. Very strong acids, $pK_a$ values below 2, are least desirable due to the rapid crosslinking rates they generate and subsequent inhibition of flow properties resulting therefrom. Acids with $pK_a$ values from 2 to 5 are preferred, with acids having $pK_a$ values of 2.5 to 4.5 most preferred.

In preparing the blends of the vinyl polymer, epoxide resin plasticizer, crosslinker and catalyst, one can also include any of the conventional additives generally used in coating compositions. The amounts thereof and their identity are well-known to those skilled in the art and do not require further discussion herein. Included are colorants, pigments or dyes such as titanium dioxide, cadmium red, carbon black, iron oxide; fillers such as calcium carbonate, barium sulfate, wood flour; stabilizers such as dibutyltin dilaurate, dibutyltin mercaptide, alkylated phenols and bisphenols, barium-cadmium salts; monomeric and polymeric plasticizers such as dioctyl phthalate, di-2-ethylhexyl phthalate, diisooctyl acetate, polymethylcaprolactone, poly(butylene glycol adipate); fungicides; bactericides; flow control additives such as the 75/25 polymer of 2-ethylhexyl acrylate and ethyl acrylate. It is also within the scope of this invention to use mixtures of both vinyl and epoxy polymers, crosslinkers, or additives in the powder coating compositions.

The vinyl polymer, epoxy resin stabilizer, crosslinker, catalyst and additives can be blended by any of the known methods including solution blending, melt compounding at temperatures below the reaction temperature of the glycidyl group, dry blending, milling or any other method or combination of methods. The formulated blend is then converted to a fine powder by any conventional means including cryogenic grinding, spray drying of a solution thereof, spray precipitation, mechanical grinding, fluidenergy milling, or any combination thereof. Those skilled in this art are fully familiar with the procedures and the equipment necessary for the production of powders. The powder composition contains essentially all of the particles preferably ranging in size from about 1 micron to about 75 microns, and more preferably from 5 to 25 microns. Generally the powders should preferably contain less than 5 per cent of the particles having a size larger than 75 microns.

The powder compositions of this invention can be used to coat substrates in the same manner that powder coating compositions are applied at present.

In a typical embodiment the vinyl polymer, epoxy resin plasticizer, crosslinker and catalyst, if present, and any other additives conventionally used in producing a powder coating are dissolved in a solvent such as acetone, methoxyethyl acetate, diethyl ether, diethylene glycol, methylene chloride, diacetone alcohol, etc. to produce a solution having a concentration of from about 10 to 20 weight per cent of vinyl resin therein for ease in subsequent powder production. This solution is then spray dried in conventional, commercially available spray drying equipment under the temperature and pressure conditions known to those skilled in the art. Ordinarily, spray drying is carried out at a temperature of from about 50° to 150°C. and the pressure in the spray dryer can be subatmospheric, atmospheric or superatmospheric. The particular temperature and pressure requirements for any specific resin solution will depend upon the components thereof and in particular the solvent present. These factors are known to those skilled in the art and present no problems to them. It is also preferable, in view of the fact that organic solvents are used, that the spray drying be carried out under an inert atmosphere. Neither temperature nor pressure are critical limitations in this process. After spray drying, the accumulated powder is recovered by conventional means and can be further treated, e.g., by fluid energy milling, cryogenic grinding, or any other known procedure desired.

The powder coating of this invention can be used by any of the conventional powder coating processes to produce thin, smooth, glossy coatings. Thus, they can be used in fluidized-bed systems or in electrostatic spray systems. The fine particle size of the powder coatings produced makes them eminently suitable for use in electrostatic powder spray coating methods. In this latter wellknown method the powder is deposited on to a substrate by means of electrostatic spray equipment and it is then fused or baked at elevated temperature to form a uniform, smooth, glossy, thin coating, with thicknesses as low as 0.2 mil often achieved. Thicker coatings can also be obtained by heavier application or multiple coating of the powder to the substrate. It was found that the powder particles were free flowing, spherical, smooth surfaced and had little tendency to stick together.

The powder coating compositions of this invention produce smooth, uniform, thermoset films that are essentially free of craters. They possess the proper liquification so as to permit adequate flow during the oven curing cycle before crosslinking has occurred. They also have good adhesion to the substrate after cure. It has been found that the powder coating compositions produce thermoset thin films and for the purpose of this invention the term "thin films" means a film of less than 5 mils in thickness.

The powder coatings were evaluated by the following procedures:

Blush Rating: The coated panels are immersed approximately three-fourths of their length into a glass water bath containing deionized, carbon dioxide free water for 45 minutes at about 76.7°F. The panels are removed, wiped dry and evaluated. The dried panels are viewed at a low angle to determine if any change in appearance is obvious between the unimmersed and immersed sections of the coating. The rating assigned is based on visual observation of opacity or milkiness developed.

Cross Hatch Adhesion: In this test the same water bath conditions are used with adhesion of the coatings tested immediately after removal of the coated panel from the water bath. After drying off excess water with a clean, soft cloth, a "cross-hatch" pattern is cut through the coating with a special holder containing a series of 10 single-edge razor cross-hatched arranged parallel to each other and spaced approximately one-eight inch apart. The cross-hatch is made by cutting two sets of lines perpendicular to each other. A strip of one-inch wide special contact adhesive tape (3M Co. —No. 610) is placed over the cross-hatch and then pressure is applied to eliminate air bubbles and provide a good bond. The tape is then removed by one quick pull at a 90° angle to the coated surface. The relative amount of the coating removed is observed and the approximate area per cent of the crosshatched section remaining on the substrate is recorded. Thus, a rating of 100 refers to no coating removal, a rating of 0 to complete removal. Satisfactory coatings will have a rating of 90 to 100 per cent.

Manual Bend Flexibility: In this procedure, the coated metal panel is bent into a U shape over a cylindrical rod of ⅛ inch diameter, with the coated section outside. The coating at and near the bend is then observed at various viewing angles with a low magnification lens for the presence of cracks or micro cracks. The presence of a significant number of such cracks signifies poor flexibility and inadequate elongation of the coating. The rating assigned is qualitative.

Wedge Bend: The test procedure for rating the relative flexibility and film continuity of a coating subjected to high-applied stress is used together with other test procedures to assess the ability of a coating to withstand post-forming typical of that encountered during the stamping of beverage can ends from flat coated stock. The test provides a relative measure of the ability of the coating to provide metal protection over areas of high stress.

In the procedure, a flat coated panel is bent into a U shape over a ⅛ inch mandrel, coated section on the outside. The bent panel is then placed in the jaws of the Gardner "Overall" Bend Impact Testor and the jaws are impacted with a 30 in-lb force which forces the bent section into a wedge shape. Film continuity is assessed by placing the wedge-bent portion of the coated panel in an acidic copper sulfate solution for 5 minutes. The solution is prepared by dissolving 20 g. of copper sulfate pentahydrate in 70 g. of water containing 10 g. of concentrated hydrochloric acid. During immersion, discontinuities or pin-holes in the coating are penetrated by the copper sulfate solution, resulting in contact with the iron in the metal panel and subsequent electrolyte action which results in the formation of dark colored copper deposited at the points of contact. The distance measured from the sharp end of the wedge bend to where copper deposit is no longer observed is defined and recorded in mm or in 1/16 inch increments (a low power magnifying glass is used). Acceptable coatings for beverage containers yield "wedge-bend" ratings varying between 0 to 16/16 inch (or 25 mm) and higher.

In the oven curing step, the powder particles on the surface fuse and the oxirane ring reacts with the crosslinker with a concommitant increase in the polymer molecular weight. Continued heating causes additional and further reaction to occur and one can ultimately obtain a thermoset polymer film coating.

The following examples serve to illustrate the invention.

EXAMPLE 1

Two hundred and eighty parts by weight of an 80/10/10 vinyl chloride/vinyl acetate/glycidyl methacrylate terpolymer having a number average molecular weight of about 10,000, 8.4 parts by weight adipic acid as crosslinker, 0.56 parts by weight stannous stearate as catalyst, 0.3 parts by weight of a 7/25 2-ethylhexyl acrylate/ethyl acrylate copolymer as a flow control additive, 2.8 parts by weight dibutyltin mercaptide and 14 parts by weight of the diglycidyl ether of bisphenol-A having a molecular weight of about 400 as the epoxy resin plasticizer is diluted with 2,754 parts by weight of acetone and dispersed in a Waring Blender to form a homogeneous solution. This product was spray dried in a Niro Laboratory Spray Dryer operating at an inlet air temperature of 125°C. and passed through a fluid energy mill twice to yield 228 grams of free flowing powder coating (yield of 74.5%).

Electrostatic deposition of the subject powder over Bonderized No. 37 steel panels with a 90 KV (-) Ransburg Electrostatic Spray unit and heat fusion at 205°C. for four minutes gave smooth, adherent film with excellent flexibility. Further tests using chrome-chrome oxide treated steel indicated good wedge bend flexibility, wet adhesion, and blush resistance. Film thicknesses of about 0.4 to 1.5 mil were used in the coatings evaluations.

EXAMPLE 2

Two hundred and eighty parts of the vinyl chloride/vinyl acetate/glycidyl methacrylate terpolymer used in Example 1 were mixed with the following materials:

| | |
|---|---|
| Adipic acid | 8.4 parts |
| Stannous stearate | 0.56 parts |
| 2-Ethylhexyl acrylate/ethyl acrylate copolymer | 0.3 parts |
| Dibutyltin mercaptide | 2.8 parts |
| Epoxidized soyabean oil | 14.0 parts |
| Acetone | 2,754 parts |

The above ingredients were mixed together and processed by the procedure of Example 1 to obtain a free flowing powder coating composition. The powder was deposited over chrome-chrome oxide treated steel and Bonderized 37 steel as described in Example 1. The coating obtained after curing for 3 minutes at 205°C. over chrome-chrome oxide steel exhibited good wedge bend flexibility, blush resistance and wet adhesion. Curing the powder coated Bonderized 37 steel for 5 minutes at 205°C. afforded coatings with good adhesion and impact resistance. Similar results are obtained by use of epoxidized linseed oil in place of the epoxidized soyabean oil.

EXAMPLES 3 THROUGH 8

An 82.6/8.0/9.4 vinyl chloride/vinyl acetate/glycidyl methacrylate terpolymer ($M_n$=10,500) was used to produce compositions according to the following formulations:

| Example | 3 | 4 | 5 | 6 | 7 | 8 |
|---|---|---|---|---|---|---|
| Terpolymer | 300 | 280 | 270 | 250 | 240 | 240 |
| Adipic acid | 6 | 8.4 | 8.1 | 7.5 | 9.6 | 9.6 |
| Stannous stearate | 0.6 | 0.56 | 0.54 | 0.5 | 0.48 | 0.48 |
| Epoxide A | — | 11.2 | — | — | — | — |
| Epoxide B | — | — | 27 | — | 48 | 48 |
| Epoxide C | — | — | — | 45 | — | — |
| Cymel 300 | — | — | — | — | — | 2.4 |
| Flow Additive* | 0.3 | 0.3 | 0.3 | 0.3 | 0.3 | 0.3 |
| Acetone | 2208 | 2162 | 2201 | 2183 | 2146 | 2162 |
| Isopropanol | 552 | 540 | 551 | 545 | 538 | 542 |

Epoxide A — diglycidyl ether of bisphenol-A
Epoxide B — poly(diglycidyl ether of bisphenol-A) having an average molecular weight of about 1,000.
Epoxide C — poly(diglycidyl ether of bisphenol-A) having an average molecular weight of about 2,000.
Cymel 300 — hexamethoxymethylmelamine

*75/25 2-ethylhexyl acrylate/ethyl acrylate copolymer

The solutions were filtered through a cloth filter, spray dried and passed twice through a fluid energy mill as described in Example 1. The powders were electrostatically spray-coated as described in Example 1 on grounded chrome-chrome oxide treated panels and cured for 5 minutes at 205°C. The results are set forth below:

| Example | Crosshatch Adhesion, % | Wedge Bend Failure in mm | Acetone Rub Cycles Passed |
|---|---|---|---|
| 3 | 100 | 12 | 100 |
| 4 | 100 | 9 | 100 |
| 5 | 100 | 20 | 5 |
| 6 | 100 | 5 | 5 |
| 7 | 100 | 20 | 45 |
| 8 | 100 | 17 | 80 |

What is claimed is:

1. A powder coating composition which comprises a mixture of:
   A. a vinyl polymer of (a) from 50 to 90 weight per cent of vinyl chloride, (b) from 1 to 25 weight per cent of glycidyl acrylate or methacrylate compound, (c) from 0 to 40 weight per cent of vinyl acetate and (d) from 0 to 40 weight per cent of other ethylenically unsaturated polymerizable monomers having the >C=C< group; said polymer having a number average molecular weight of from 2,500 to 40,000;
   B. an epoxy resin plasticizer at a concentration of from 1 to 15 weight per cent of said vinyl polymer; said plasticizer selected from the group consisting of bisphenol epoxide resins, cycloaliphatic epoxides and resins thereof, aliphatic diglycidyl ethers and esters and epoxidized fatty oils; and
   C. a crosslinker for the oxirane moiety in said vinyl polymer and said epoxy resin plasticizer, said crosslinker being present at a concentration of from 0.1 to 1 mole equivalent of reactive group thereof per mole equivalent of oxirane group.

2. A powder coating composition as claimed in claim 1, wherein said vinyl polymer has a molecular weight of from about 5,000 to about 25,000 and a glass transition temperature of at least 40°C.

3. A powder coating composition as claimed in claim 1, wherein said epoxy resin plasticizer is present at a concentration of from 2 to 5 weight per cent of said vinyl polymer.

4. A powder coating composition as claimed in claim 1, wherein said crosslinker is present at a concentration of from 0.2 to 0.6 mole equivalent of reactive group thereof per mole equivalent of oxirane group.

5. A powder coating composition as claimed in claim 1, wherein said vinyl polymer is a vinyl chloride/vinyl acetate/glycidyl methacrylate terpolymer.

6. A powder coating composition as claimed in claim 1, wherein said resin plasticizer is diglycidyl ether of bisphenol-A.

7. A powder coating composition as claimed in claim 1, wherein said resin plasticizer is epoxidized soybean oil.

8. A powder coating composition as claimed in claim 1, wherein a catalytic amount of catalyst is additionally present.

9. A powder coating composition as claimed in claim 1, wherein a colorant or pigment is additionally present.

10. A powder coating composition as claimed in claim 1, wherein a flow control agent is additionally present.

* * * * *